Patented Mar. 2, 1937

2,072,255

UNITED STATES PATENT OFFICE 2,072,255

METHOD OF MANUFACTURING RUBBER CHLORIDE

Erich Gebauer-Fuelnegg, deceased, late of Evanston, Ill., by Marie Gebauer-Fuelnegg, Evanston, Ill., administratrix, and Eugene W. Moffett, Gary, Ind., assignors, by mesne assignments, to Marbo Patents, Inc., a corporation of Delaware No Drawing. Application January 28, 1935, Serial No. 3,804

3 Claims. (Cl. 260—1)

This invention relates to a method of manufacturing rubber chloride and other halides of rubber or the main chemical constituents of rubber, such as polymers and derivatives of butadiene.

It has heretofore been known that rubber and similar compounds can be chlorinated by subjecting such compounds to the action of chlorine gas under pressure at somewhat elevated temperatures. We have now found that the chlorination of rubber may be much more quickly and economically carried out by subjecting the rubber, preferably in a thin sheet or finely divided form, to the action of liquefied chlorine under conditions suitable for maintaining the chlorine in a liquefied state. The product obtained by the method of our invention is relatively stable and in general more satisfactory as to its properties and qualities than rubber chloride made by previously known processes.

It is therefore an object of this invention to provide a halide of a polymer or other derivative of a butadiene or diolefine.

It is a more particular object of this invention to provide a method of preparing rubber chloride by the use of liquefied chlorine.

It is a further important object of this invention to provide a relatively simple and inexpensive method of preparing rubber chloride without the use of organic solvents by treatment of rubber with liquefied chlorine.

Other and further important objects of this invention will become apparent from the following description and appended claims.

Rubber and rubber-like substances as referred to in this specification include substances having the following nuclear formula:

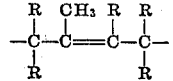

in which R may be a suitable substituent group, such as for example an alkyl, aryl, halogen atom, hydrogen atom, and the like. This is a general nuclear formula for a group of polymerized hydrocarbons which may be derived from butadiene or erythrene. Members of this group of substances, generically referred to as polymerized butadiene bodies, are operative in the present process. The principal active ingredients of naturally occurring materials, such as rubber, gutta percha, balata, etc. belong to this group of hydrocarbons. These naturally occurring substances are the preferred starting materials in the commercial operation of the present process. However, it will be understood that butadiene, isoprene and similar substances produced by artificial means are also operative. In fact, diolefines of the general formula $C_nH_{2n-2}$ and their polymers are operative for the purposes of my invention.

As an example of our process, as applied to a solid butadiene derivative, the following procedure is given:

Unvulcanized or partly vulcanized rubber is sheeted on suitable rolls to give a continuous strip, as described in the copending application of Gebauer-Fuelnegg, Moffett and Irving, Serial No. 739,554, filed August 13, 1934. The continuous strip of rubber is passed through a bath of liquefied chlorine at a rate sufficient to permit the reaction to run to the desired degree of completion. In the case of a strip of rubber having a thickness of less than about 0.02 of an inch, the time of immersion of the rubber in the liquid chlorine need not be more than several minutes but with thicker rubber sheets or strip material, the time of immersion should be increased somewhat, say, up to 4 to 6 minutes for rubber having a thickness of between 0.02 and 0.06 inch in thickness. After leaving the bath of liquid chlorine, the reacted rubber can be passed through a heated chamber to drive off any excess of chlorine or hydrogen chloride, which is formed as a byproduct of the reaction between rubber and chlorine.

Any rubber, either milled or unmilled, is suitable, although pale crepe rubber is preferred to smoked rubber, because of the lighter color of pale crepe rubber. Instead of forming the rubber into a strip of thin sheet material, the rubber may be subdivided in any manner desired so long as a relatively large surface area is presented to the chlorine. Powdered rubber may be used satisfactorily.

Milling the rubber has no effect upon the reaction but has the effect of increasing the plasticity of the finished sheet material, if the rubber chloride is to be made up into sheets or films. Consequently, where a harder sheet is desired, unmilled rubber should be used. The use of milled rubber, however, has the additional advantage that the resulting rubber chloride is more readily soluble in the solvents used in preparing the sheet material than when unmilled rubber is used. Pale crepe rubber milled to a Williams plasticity of 210 and dead milled rubber having a Williams plasticity of 120 have been successfully used in this process. By "dead milled" rubber is meant rubber which has been milled until further milling will produce no further change in plasticity.

The reaction of the liquid chlorine on the rubber results in a substantially complete chlorination of the rubber if the time of contact with the liquid chlorine is sufficient and if the partially reacted rubber is exposed to either natural or artificially produced ultraviolet light. Where the reaction is carried out wholly in the dark, the rubber absorbs the theoretical amount of chlorine to saturate the double bonds. The product corresponds mainly with the addition product, $C_5H_8Cl_2$, and analyzes from 51 to 56% chlorine.

If, however, the rubber is exposed to light containing ultraviolet rays, after removal of the rubber from the liquid chlorine, a substitution reaction takes place, whereby the chlorine content is further increased to from 55 to 65%. Exposure to light during immersion produces but little change in the chlorine content. Subsequent exposure to light, however, brings about the substitution of chlorine in the rubber molecule and thus aids in removing occluded chlorine from the final product.

Catalytic amounts, such as 1% by weight and less, of such inorganic chemicals as phosphorus oxychloride, phosphorus pentachloride, selenium oxychloride and thionyl chloride, serve to effect a more complete reaction between the rubber and liquefied chlorine.

The hydrogen chloride that is given off during the addition reaction may be utilized in the hydrochlorination of rubber in accordance with the method disclosed in our Patent No. 1,980,396, dated November 13, 1934.

In carrying out the process of our invention, it is preferable to have the rubber as dry as possible before it is introduced into the bath of liquid chlorine. Otherwise an unnecessary amount of water is introduced into the system and this increases the corrosive effect of the chlorine and hydrogen chloride on the equipment used. The liquid chlorine is, of course, introduced into the reaction vessel in substantially anhydrous form, such as may be commercially obtained. Any moisture that inadvertently enters the system may be condensed out by fractional refrigeration or by the use of dehydrating chemicals, such as calcium chloride and the like.

As previously stated, the reaction between chlorine and rubber is carried out at a temperature at or below the boiling point of chlorine, which is —33.6° C. under atmospheric pressure. It is, however, possible to maintain the chlorine in liquid condition by the use of elevated pressures even at slightly higher temperatures than the boiling point of chlorine, in accordance with the well known gas laws.

The process of this invention has the great advantage over other processes using gaseous chlorine in that it requires a matter of only minutes in which to carry the reaction to completion and the reaction can be carried out continuously by the use of sheet or strip rubber rather than as a batch process. In this way considerable economy in time and labor are made possible.

The rubber chloride, as obtained in our process, is a whitish, spongy product of asbestos-like structure. When the rubber is reacted upon in sheet form, the product is directly obtained as a continuous sheet, greatly expanded as compared with the initial rubber sheet.

We are aware that numerous details of the process may be varied through a wide range without departing from the principles of this invention, and we, therefore, do not purpose limiting the patent granted hereon otherwise than necessitated by the prior art.

We claim as our invention:

1. In a process for producing a compound of a polymerized butadiene body and chlorine, the step of reacting the polymerized butadiene body with liquid chlorine at a temperature not above —33.6° C.

2. In a process for producing a compound of rubber and chlorine, the step of reacting rubber with liquid chlorine at a temperature not above —33.6° C.

3. In a process for producing a compound of rubber and chlorine, the step of continuously passing thin sheet rubber through a bath of liquid chlorine at a temperature not substantially above —33.6° C.

MARIE GEBAUER-FUELNEGG,
*Administratrix of the Estate of Erich Gebauer-Fuelnegg, Deceased.*
EUGENE W. MOFFETT.